DAMPED SERVO SYSTEM FOR TV TAPE RECORDER TRANSDUCER HEAD

Filed May 16, 1966

2 Sheets-Sheet 1

INVENTORS
TAKAYA MORITA
SHUYA ABE

BY [signature]
ATTORNEY

July 7, 1970 TAKAYA MORITA ET AL 3,519,738

DAMPED SERVO SYSTEM FOR TV TAPE RECORDER TRANSDUCER HEAD

Filed May 16, 1966 2 Sheets-Sheet 2

INVENTORS
TAKAYA MORITA
SHUYA ABE
BY [signature]
ATTORNEY

United States Patent Office 3,519,738

Patented July 7, 1970

3,519,738

DAMPED SERVO SYSTEM FOR TV TAPE RECORDER TRANSDUCER HEAD

Takaya Morita, Sagamihara, and Shuya Abe, Tokyo, Japan, assignors to Raytheon Education Company, a corporation of Delaware Filed May 16, 1966, Ser. No. 550,545
Int. Cl. H04n 5/76; H03c 3/08
U.S. Cl. 178—6.6 20 Claims

ABSTRACT OF THE DISCLOSURE

An electronic servo system uses electronically generated error signals to eliminate jitter heretofore caused by variations in the head speed on a TV tape recorder. The error signal is a product of a head speed deviation signal and a standard signal which are mixed together to produce a phase modulated signal. This modulated signal is applied to energize the windings of the head motor used to drive a revolving transducer disk in a helical scan TV tape recorder.

This invention relates to a damping servo system and more particularly to a damping servo system incorporating modulator systems which are highly sensitive, accurate and reliable in operation. These systems are fast in response. The effects of noise and extraneous signals, supply voltage variations and the like are minimized. It is relatively simple and economical to construct these systems. The modulator systems of this invention are particularly advantageous when incorporated in servo systems in providing stable operation without any hunting or over-correction effects.

The modulator systems of this invention were particularly designed for use in a video tape recorder to control the movement of head means across a magnetic medium. By way of example, the systems are usable in a recorder of a type in which a magnetic tape is fed from a supply reel to travel in a helical path around a guide drum assembly and thence past a drive capstan to a take-up reel. The guide drum assembly has spaced portions which define a slot exposing a track extending diagonally across the tape. A pair of rotatable, diametrically opposed heads are movable in the slot to alternately traverse tracks on the tape. In recording a television signal, the heads may preferably be driven at a speed such that an integer number of fields of the video signal are recorded on each track.

In the recording operation, a separate control head may be used to record a signal at the field rate on an edge portion of the tape. The control signal is reproduced in the reproducing operation to control the capstan drive motor, so as to cause the heads to properly track. Difficulties have been experienced with such video tape recorders due to "jitter," arising from variations in the speed of the heads relative to the tape.

This invention was made with the object of overcoming the disadvantages of prior systems and of providing a system for accurately controlling the operation of a capstan drive motor, or the like, to eliminate jitter and other undesirable effects.

Another object of this invention is to provide modulator systems, usable in a variety of applications, to provide fast response and highly accurate and sensitive operation, while being stable and reliable.

According to an important feature of the invention, a phase modulated signal is produced by combining an amplitude modulated signal having an amplitude proportional to the deviation of a control signal from a certain reference level. This deviation may be either in phase or 180 degrees out of phase with a first reference AC signal. Deviation in phase occurs according to the direction of the deviation from the reference level with a second reference AC signal in approximately a 90 degree phase relation to the first reference AC signal. With this arrangement, the phase modulated signal has an amplitude which remains substantially equal or in fixed proportion to that of the second reference signal over a substantial range. Since a reference AC signal can be produced with a stable amplitude, the phase modulated signal can be produced with a corresponding amplitude stability. Further, in systems such as servo systems wherein the control signal represents an error value, the phase modulated signal correpond only to the second reference AC signal when the control signal is at the certain reference level. This arrangement further increases the stability and reliability of the system.

Still another advantage of the phase modulator system is that the amplitude modulation can be obtained electronically at a high rate of speed, thereby overcoming disadvantages of phase resolver systems or the like. Phase changes are produced by mechanical movements which cannot be effected at a high rate of speed.

Another important feature of the invention resides in the use of the phase modulator in a servo system with the phase modulated signal being used to energize an AC motor. The control signal is developed in response to changes in the velocity of means driven by the motor.

According to a specific feature, the system is used in video signal recording apparatus with the phase modulated signal being used to energize the motor for driving magnetic head means. The control signal is developed in response to synchronizing signals reproduced as a function of the movement of the head means across the magnetic medium.

Another feature of the invention relates to the production of a second phase modulated signal by combining a second amplitude modulated signal having an amplitude proportional to deviation of the control signal from a certain reference level. Deviation may be either in phase or 180 degrees out of phase with the second reference AC signal. With this arrangement, two phase modulated signals are produced in 90 degree phase relation. Preferably, such phase modulated signals may be used to energize windings of a two phase AC motor.

A further very important feature of the invention relates to the production of an amplitude modulated signal by means of two non-linear circuit elements having characteristics such that the impedance thereof varies in accordance with current therethrough. First signal means are used to vary the total current through the elements. Second signal means are used to vary the current through one of the elements in relation to current through the other. Utilization means are provided responsive to current flow through one of the elements. Preferably, the elements may be semi-conductor diodes or the like having characteristics such that the current therethrough varies exponentially with the voltage thereacross.

With this arrangement, amplitude modulation can be effected over a comparatively large range without substantial distortion such as would otherwise be obtained with the use of a non-linear circuit element.

The amplitude modulator using parallel-connected non-linear circuit elements is particularly advantageous in a phase modulator system such as described above, in that the phase modulation can be produced accurately and rapidly.

A further feature of the invention relates to the provision of a balanced circuit arrangement such that the modulating signal component can be eliminated from the output signal. With this arrangement, a second pair of parallel-connected non-linear circuit elements are provided with an output being taken from elements from both pairs. The control or reference signals to the two pairs of elements are applied in inverse phase relation.

Other features of the invention relate to the provision of amplifier devices for controlling current flow through the non-linear circuit elements, preferably with the amplifier devices being preferably in the form of transistors. With the circuit arrangements of this invention, a relatively high impedance is presented to an input control signal, while obtaining stable and accurate control of modulation.

This invention contemplates other objects, features and advantages which will become more fully apparent from the following detailed description taken in conjunction with the accompanying drawings which illustrate a preferred embodiment and in which.

Figures 1, 3:
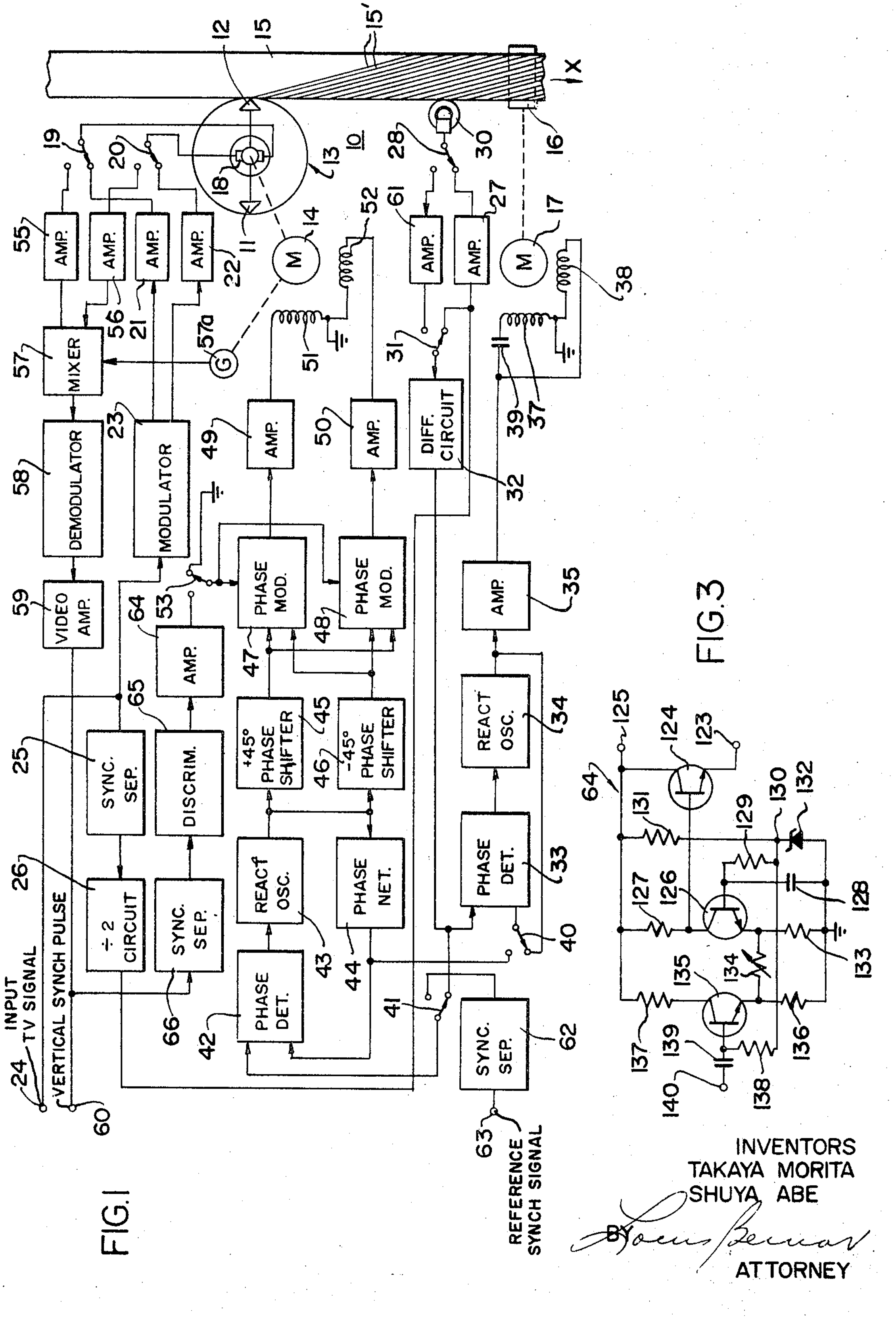
FIG. 1 is a schematic block diagram of a video tape recorder system constructed in accordance with the principles of this invention.
FIG. 3 is a circuit diagram of an amplifier for applying signals to the phase modulator shown in FIG. 2.

Referring to FIG. 1, reference number 10 generally designates a video tape recording and reproducing system constructed in accordance wtih the principles of this invention. The system 10 comprises a pair of magnetic heads 11 and 12 carried at diametrically opposite points on a rotatable disk 13 which is driven by a motor 14. As diagrammatically illustrated, the heads 11 and 12 are arranged to be brought into an engagement with a magnetic tape 15 to trace tracks 15′ extending obliquely from one edge of the tape 15 to the other. As the tape 15 is moved in the direction of arrow X, the tape is driven by means including a capstan 16 driven by a motor 17. With two diametrically opposed heads, the arrangement is preferably such that each of the heads is in engagement with the tape while being rotated through an angle slightly more than 180 degrees. It will be understood that the invention is not necessarily limited to two heads, and any number of heads may be used.

The invention is particularly concerned with the arrangement for energizing the head drive motor 14, but before describing that arrangement, the overall system will be first described.

The heads 11 and 12 are respectively connected through a slip ring assembly 18 to ganged record-reproduce selector switches 19 and 20. In the record position of the switches 19 and 20 as illustrated, the heads 11 and 12 are connected to the outputs of a pair of recording amplifiers 21 and 22 which have inputs connected to outputs of a frequency modulator circuit 23 to which a signal to be recorded is applied from an input terminal 24.

The signal to be recorded is preferably a television video signal having vertical synchronizing signal components which are separated out by a separator circuit 25 to develop a signal which is applied to a divide-by-two circuit 26, to develop a signal at a frequency equal to one-half the vertical synchronizing pulse frequency. Normally, the vertical synchronizing pulse frequency is 60 cycles per second, so that the output of the divide-by-two circuit 26 is a 30 cycle per second signal. In the recording operation, the output of the divide-by-two circuit 26 is applied through an amplifier 27 and a selector switch 28 to a control head 30 which functions to record a signal on an edge portion of the tape 15. The output of the divide-by-two circuit 26 is also applied through a selector switch 31 and through a differentiating circuit 32 to one input of a phase detector 33 which controls a reactance oscillator 34 to develop a signal which is amplified by an amplifier 35 and applied to windings of the capstan drive motor 17.

The motor 17 is preferably a two phase 60 cycle hysteresis synchronous motor having windings 37 and 38 connected to the output of amplifier 35, with a phase shift capacitor 39 in series with the winding 37.

A second input of the phase detector 33 is connected through a selector switch 40 to the output of the reactance oscillator 34 and the phase detector 33 operates to compare the output of the oscillator 34 with the signal applied from the differentiating circuit 32 to so control the reactance oscillator 34 as to maintain synchronized operation.

The output of the differentiating circuit 32 is also applied through a selector switch 41 to a phase detector 42 which controls a reactance oscillator 43 having an output connected through a phase shift network of 44 to a second input of the phase detector 42. The output of the reactance oscillator 43 is synchronized with the output signal from the differentiating circuit 32.

The output of the reactance oscillator 43 is connected to phase shifter circuits 45 and 46, circuit 45 is operative to produce a leading phase shift of 45 degrees. Circuit 46 is operative to produce a lagging phase shift of 45 degrees. Thus, there are two output signals having a 90 degree phase shift therebetween. Such output signals are applied through two phase modulator circuits 47 and 48 to inputs of amplifiers 49 and 50. The outputs of these amplifiers are connected to windings 51 and 52 of the head drive motor 14, which is preferably a two phase 60 cycle hysteresis synchronous motor.

In the recording operation, control signal inputs to the phase modulator circuits 47 and 48 are connected to ground through a selector switch 53 to render the circuits inoperative. These circuits are used in the reproducing mode of operation, as hereinafter described.

In the reproducing mode of operation, the heads 11 and 12 are connected through the slip ring assembly 18 and through the selector switches 19 and 20 to the input of a pair of amplifiers 55 and 56. The outputs of these amplifiers are connected to inputs of a channel mixer circuit 57 which is controlled by a small generator **57*a* driven by the motor 14 in synchronism with the drive of the heads 11 and 12. The mixer 57 functions to alternately apply the outputs of the amplifiers 55 and 56 to a demodulator circuit 58 having an output which is applied through a video amplifier circuit 59 to an output terminal 60**.

In the reproducing mode of operation, the selector switches 28, 31, 40, 41 and 53 are moved to positions opposite to those illustrated. Selector switch 28 operates to apply a reproduced signal developed by the control head 30 to the input of an amplifier 61. The output of which is then connected through the selector switch 31 and through the differentiating circuit 32 to one input of the phase detector 33. Switch 40 operates to connect the other input of phase detector 33 to the output of the phase shift network 44. Also, the output of the phase shift network 44 is connected to the input of the phase detector 42. Switch 41 operates to connect the other input of the phase detector 42 to the output of a synchronizing signal separating circuit 62 connected to an input terminal 63 to which a source of reference synchronizing signals may be applied. The phase detector 42 then controls the reactance oscillator 43 in response to such signals. The phase detector 33 operates to compare the output of the reactance oscillator 49, after being shifted by the network 44, with the signal from the control head 30, derived through the amplifier 61 and differentiating circuit 32. The capstan drive motor 17 is then controlled to produce a synchronized relation between the reproduced control signals developed by the head 30 and the rotation of the heads 11 and 12.

The system as thus far described operates satisfactorily in response to long term jitter (i.e. relatively slow changes in the operating conditions) to maintain uniform speeds and proper tracking. However, difficulties are experienced in connection with short term jitter (i.e. relatively rapid changes in operating conditions) the effect of which is to produce visible fluctuations and distortions in a reproduced picture.

It has been found that short term jitter results to a large extent from a variation in the velocity of the heads 11 and 12 relative to the tracks on the tape 15. Such velocity variations can be reduced by exercising great care in the construction and the adjustment of the mechanical parts of the system, but even with the utmost care being used, it is still not possible in practice to avoid short term jitter effects.

According to this invention, a negative feedback is incorporated in the servo system for the head drive motor. The feedback is in the form of a velocity feedback operative to stabilize the velocity of the heads 11 and 12 relative to the tracks on the tape 15. With this feedback, a damped servo system results. There is an extremely fast response speed coupled with high stability, which substantially eliminates short term jitter effects, even with substantial imperfections in mechanical construction.

In the illustrated system, control signal inputs to the phase modulators 47 and 48 are coupled through the selector switch 53 to the output of an amplifier 64. An input of this amplifier is connected to the output of a discriminator circuit 65, responsive to signals from a synchronizing signal separation circuit 66 which is connected to the output of the reproducing video amplifier 59.

In operation, reproduced horizontal synchronizing pulses are separated out by the circuit 66. The discriminator 65 operates responsive to rapid increases or decreases in the rate of the horizontal synchronizing pulses to develop a control signal which is applied to the phase modulators 47 and 48. These modulators automatically produce a phase lag or a phase lead in the AC currents applied to the coils 51 and 52 of the head drive motor 14, to maintain a substantially constant velocity of the heads 11 and 12 relative to the tracks on the tape 15, within very narrow limits.

Figures 2, 4:
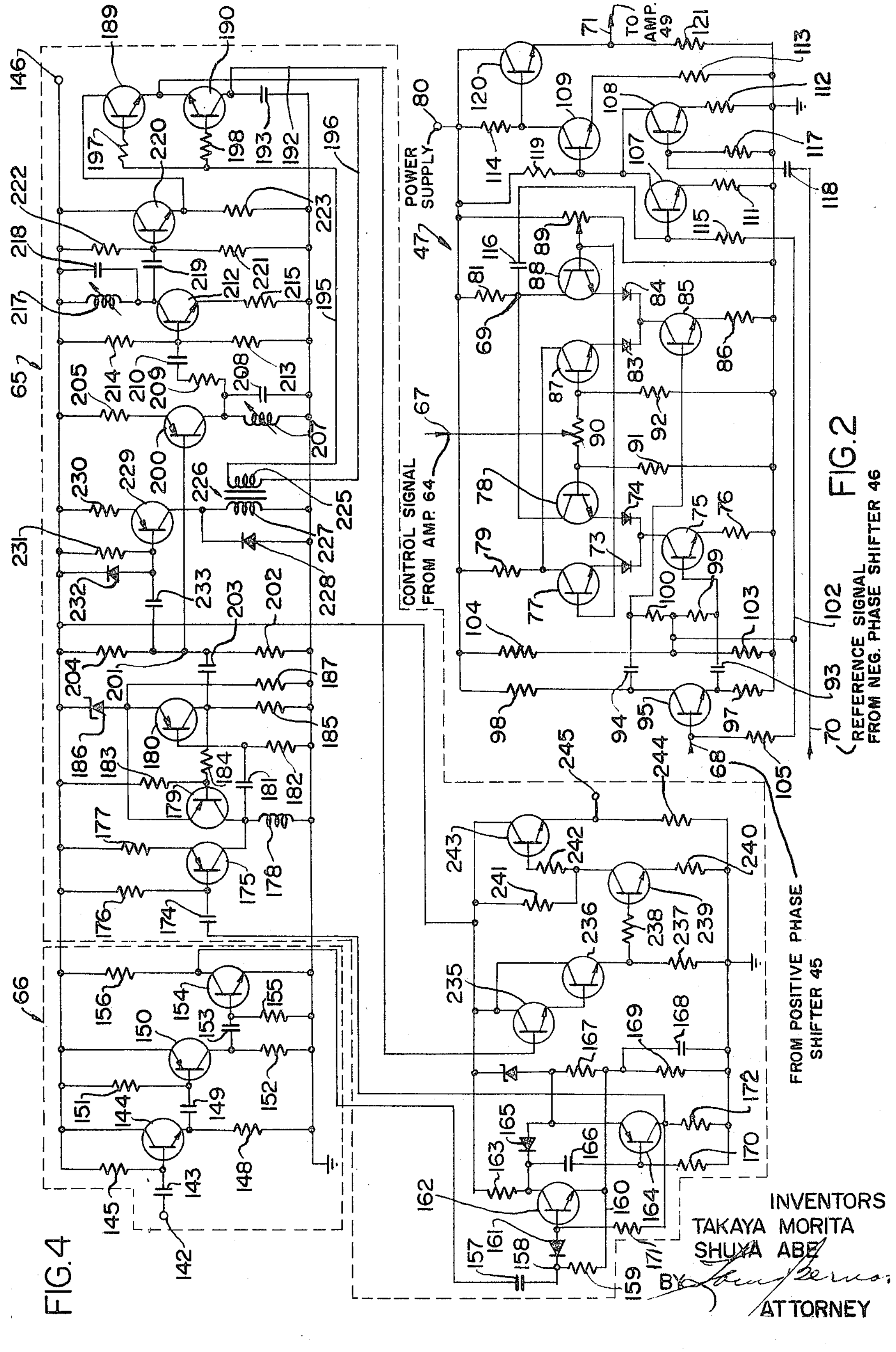
FIG. 2 is a circuit diagram of a phase modulator of the system of FIG. 1.
FIG. 4 is a circuit diagram of synchronizing signal separating and discriminating circuits of the system of FIG. 1.

Important features of the invention reside in the circuitry of the phase modulators 47 and 48. These modulators have extremely fast response, as is required to obtain the desired elimination of short term jitter. FIG. 2 illustrates the circuit of the phase modulator 47, which is the same as that of the phase modulator 48. In general, the circuit 47 includes amplitude modulator means which operates responsive to a control signal applied on a line 67 from the output of the amplifier 64. An AC signal is applied to a line 68 from the plus 45 degree phase shifter 45. At a circuit point 69, an amplitude modulated AC signal appears, having an amplitude proportional to the deviation of the control signal appearing on line 67, from a certain reference level. Deviation is either in phase or 180 degrees out of phase with the reference signal applied on line 68, according to the direction of the signal's deviation away from the reference level. The amplitude modulated AC signal developed at point 69 is combined with another reference signal applied over line 70 from the minus 45 degree phase shifter 46. Responsive thereto, a phase modulated signal appears on an output line 71 from which it is applied to the amplifier 49. As discussed previously, the phase modulated signal so developed has an amplitude which is substantially constant over a comparatively wide range of phase variations.

In accordance with this invention, the amplitude modulator is a balanced modulator in which the control signal applied over line 67 is substantially eliminated from the output signal developed at circuit point 69. The amplitude modulator comprises two sections of substantially identical configurations. The first section comprises a pair of diodes 73 and 74 connected in generally parallel relation. The cathodes of these diodes are connected together and to the collector of a transistor 75 having its emitter connected through a resistor 76 to ground. The anodes of the diodes 73 and 74 are connected to the emitters of a pair of transistors 77 and 78, respectively. The collector of transistor 77 is connected through a resistor 79 to a power supply terminal 80. The collector of transistor 78 is connected to the circuit point 69, which is connected through a resistor 81 to the terminal 80. The other amplitude modulator section comprises a pair of diodes 83 and 84. The cathodes of these diodes are connected together and to the collector of a transistor 85. Its emitter is connected through a resistor 86 to ground. The anodes of diodes 83 and 84 are connected to the emitters of a pair of transistors 87 and 88, having their collectors, respectively, connected to the collectors of transistors 77 and 78.

The base of the transistor 77 and the base of the transistor 88 are connected together and to the movable contact of a potentiometer 89, which is connected between ground and the power supply terminal 80. The base of the transistor 78 and the base of the transistor 87 are connected to the opposite end terminals of a potentiometer 90 having a movable contact connected to the line 67, and these bases are also connected through resistors 91 and 92 to ground. A control signal is applied to the base of transistor 78 to control the current through diode 74, relative to the current through diode 73. A reference signal is applied to the base of the transistor 75 to provide a further control of the current through a diode 74. The potential of the circuit point 69 is thereby affected by both the control signal and the reference signal. The reference signal applied to transistor 75 also affects the current flow through the diode 73. The total current flow through diodes 73 and 74 is controlled by transistor 75. This is quite important because it minimizes distortions which would otherwise be produced if a single diode were used.

The second amplitude modulator section includes diodes 83 and 84, and it operates in a similar fashion. However, the control signal is applied to the base of transistor 87 while the potential of circuit point 69 is controlled in response to current flow through the transistor 88.

To provide a balanced operation and to eliminate the control signal component from the output signal developed at circuit point 69, the reference AC signal components are applied to the transistors 75 and 85, in inverse phase relation. In particular, the bases of transistors 75 and 85 are connected through coupling capacitors 93 and 94 to emitter and collector electrodes of a transistor 95. They are also connected through resistors 97 and 98 to ground and to the power supply terminal 80, respectively. The input line 68 is connected to the base of transistor 95. To provide proper bias, the bases of transistors 75 and 85 are connected through resistors 99 and 100 to a line 102 which is connected through a resistor 103 to ground and through a resistor 104 to the power supply terminal 80.

The base of transistor 95 is connected to the line 102 through a resistor 105.

To combine the amplitude modulated signal developed at circuit point 69 with the reference signal on line 70, mixer means are provided including transistors 107, 108 and 109. The collectors of transistors 107 and 108 are connected together and to the base of transistor 109. The emitters of transistors 107 and 108 are connected through resistors 111 and 112 to ground. The emitter and collector electrodes of transistor 109 are connected to the ground and to power supply terminal 80 through resistors 113 and 114, respectively. The base of transistor 107 is connected through a resistor 115 to the bias line 102 and through a coupling capacitor 116 to the circuit point 69. Current through transistor 107 is thereby controlled by the amplitude modulated signal appearing at circuit point 69. The base of transistor 108 is connected through a resistor 117 to ground and also through a coupling capacitor 118 to the line 70. Thus, the current through transistor 108 is controlled by the reference signal on line 70. The collectors of transistors 107 and 108 are connected through a resistor 119 to the power supply terminal 80 so that the potential of the base of transistor 109 is controlled both in response to the amplitude modulated signal at circuit point 69 and the reference signal on line 70.

The transistor 109 develops an amplified signal at its collector which is applied to the base of a transistor 120 operated as an emitter-follower, the collector thereof being connected to terminal 80. The emitter of transistor 120 is connected to the output line 71 and also through a load resistor 121 to ground.

FIG. 3 shows the circuit of the amplifier 64 which is used to apply the controlled signal to the phase modulators 47 and 48. In this circuit, an output terminal 123 is connected to the emitter of a transistor 124. Its collector is connected to a power supply terminal 125 to which a positive voltage may be applied. The base of transistor 124 is connected to the collector of a transistor 126 and also through a resistor 127 to the power supply terminal 125. The base of transistor 126 is connected through a capacitor 128 to ground and also through a resistor 129 to a circuit point 130. This point is connected through a resistor 131 to the power supply terminal 125 and through a Zener voltage-regulating diode 132 to ground. The emitter of transistor 126 is connected through a resistor 133 to ground and through a rheostat 134 to the emitter of a transistor 135 which is connected through a resistor 136 to ground. The collector of transistor 135 is connected through a resistor 137 to the power supply terminal 125. The base of transistor 135 is connected through a resistor 138 to the circuit point 130 and also through a coupling capacitor 139 to an input terminal 140.

In operation, an input signal applied at terminal 140 controls the current flow through transistor 135, operated as an emitter-follower, to control the base-emitter current of transistor 126. This controls the potential of the collector of transistor 126 which is connected to the base of the output transistor 124 which is also operated as an emitter-follower.

FIG. 4 shows the circuits of the synchronizing signal separator circuit 66 and the discriminator circuit 65. The overall function of these two signals is to develop an output signal at a level corresponding to the rate of horizontal synchronizing pulses in the reproduced video signal.

In the separator circuit 66, a reproduced video signal from the video amplifier 59 is fed to an input terminal 142. This terminal is connected through a coupling capacitor 143 to the base of a transistor 144. The base is also connected through a resistor 145 to a power supply terminal 146. The transistor 144 is operated as an emitter-follower. Its collector is connected to the power supply terminal 146, and its emitter is connected to ground through a resistor 148. The signal developed at the emitter of transistor 144 is applied through a coupling capacitor 149 to the base of a transistor 150, which is also connected through a resistor 151 to the power supply terminal 146. The emitter of transistor 150 is connected to the power supply terminal 146. The collector thereof is connected through a resistor 152 to ground. Also, the collector is connected through a coupling capacitor 153 to the base of a transistor 154 which is further connected through the resistor 155 to ground. The emitter of transistor 154 is grounded, while its collector is connected through a resistor 156 to the power supply terminal 146.

With this circuit, transistors 150 and 154 operate as synchronizing signal separators to clip out the video portion of the reproduced video signal applied to input terminal 142, and to leave only the separated synchronizing pulses. These separated synchronizing pulses are applied through a capacitor 157 to a circuit point 158 which is connected through a resistor 159 to a line 160. Capacitor 157, together with resistor 159, have a short time constant and operate as a differentiating circuit to develop sharp negative-going pulses coincident with the leading edges of horizontal synchronizing pulses. Such negative-going pulses are applied through a diode 161 to the base of a transistor 162. Its emitter is connected to the line 160, and its collector is connected through a resistor 163 to the power supply terminal 146.

Transistor 162 together with another transistor 164 form a monostable multivibrator which develops relatively wide pulses. Preferably, these pulses have a duration or width of about 50 $\mu$s. Thus, the output pulse has a constant repetition rate equal to that of the horizontal synchronizing pulses (15,750 per second) without being affected by equalizing the pulses, vertical serration pulses, or noise signals. In particular, the collector of the transistor 162 is connected through a diode 165 to the emitter of transistor 164 and through a capacitor 166 to the base of transistor 164. The emitter of transistor 164 is further connected through a resistor 167 to the line 160. Ground is applied to line 160 through a capacitor 168 and a resistor 169. The base of transistor 164 is connected through a resistor 170 to ground, while the collector thereof is connected through a resistor 171 to the base of transistor 162, and also through a resistor 172 to ground.

When a negative-going pulse is applied through the diode 161, to the base of transistor 162, a pulse of a relatively large duration or broad width is developed at the collector of transistor 164.

The broad width pulse so developed is applied through a capacitor 174 to the base of a transistor 175. This base is connected through a bias resistor 176 to the power supply terminal 146. The emitter of transistor 175 is connected through a resistor 177 to the power supply terminal 146. The collector thereof is connected through an inductor 178 to ground.

The capacitor 174, together with the resistor 176, has a short time constant and forms another differentiating circuit to develop a sharp pulse which is applied through the transistor 175 to another monostable multivibrator comprising a pair of transistors 179 and 180. This monostable multivibrator generates a pulse of short duration, preferably of about 32 microseconds.

The circuit of the monostable multivibrator is formed by transistors 179 and 180. The collector of the transistor 179 is connected to the collector of transistor 175. The base of transistor 179 is connected through a resistor 184 to the collector of transistor 180, which is also connected through a resistor 185 to ground. The emitter of transistor 179 is connected to the emitter of transistor 180. A Zener voltage-regulating diode 186 connects this emitter to the power supply terminal 146. The emitter is connected through a resistor 187 to ground.

The monostable multivibrator circuit including transistors 179 and 180 operates to generate a relatively short duration pulse at the collector of transistor 180. This pulse is applied to a sampler circuit which includes a pair of transistors 189 and 190 which operate as switches to compare a signal of substantially constant frequency with a signal which is generated directly from the input signal. This signal closely follows changes in the rate of the input signal. The circuit operates to generate a voltage on a line 192 which closely follows changes in the rate thereof. The circuit operates to generate a voltage on a line 192 which increases and decreases in response to relatively rapid changes in the rate of the horizontal synchronizing pulses.

Line 192 is connected through a capacitor 193 to ground. Also, this line is connected to the collector of transistor 190. The emitters of transistors 189 and 190 are connected together and with an AC voltage of substantially constant frequency being applied between the collector transistor 189 and ground. A signal of varying frequency occurs responsive to the horizontal synchronizing pulses of the reproduced signal and is applied between lines 195 and 196. Line 195 is connected through resistors 197 and 198 to the base electrodes of transistors 189 and 190. Line 196 is connected to the junction between the emitters of transistors 189 and 190. With this arrangement, the capacitor 193 is charged or discharged in response to changes in the phase relation between the substantially constant frequency signal applied between the collector of transistor 189 and ground and the variable frequency signal applied between the lines 195 and 196.

To develop the constant frequency signal, a tuned amplifier circuit is provided. An input transistor 200 has a base connected to a circuit point 201. This point is also connected through a resistor 202 to ground, through a coupling capacitor 203 to the collector of transistor 180, and through a resistor 204 to the power supply terminal 146. The emitter of transistor 200 is connected through a resistor 205 to the power supply terminal 146. The collector thereof is connected to ground through a tuned circuit comprising a variable inductor 207 and a capacitor 208. The collector is also connected through a resistor 209 and a capacitor 210 to the base of a transistor 212. This base is connected through a resistor 213 to ground and through a resistor 214 to the power supply terminal 146. The emitter of transistor 212 is connected through a resistor 215 to ground. The collector thereof is connected to the power supply terminal 146 through a tuned circuit comprising a variable inductor 217 and a capacitor 218. The collector of transistor 212 is also connected through a coupling capacitor 219 to the base of a transistor 220. The base is also connected through a resistor 221 to ground and through a resistor 222 to the power supply terminal 146. The transistor 220 is operated as an emitter-follower. The collector thereof is connected to the power supply terminal 146. The emitter thereof is connected through a resistor 223 to ground and to the collector of the switching transistor 189.

The tuned circuits, connected to the collectors of the transistors 200 and 212, have high Q such that a sine wave signal is developed at the emitter of transistor 220. This signal has a frequency equal to the average value of the frequency of the reproduced horizontal synchronizing pulses. It may change in response to slow changes in the frequency of such horizontal synchronizing pulses, but it does not follow rapid changes in the frequency of the horizontal synchronizing pulses.

To develop the signal on lines 195 and 196, they are connected to a secondary winding 225 of a transformer 226. A primary winding 227 is connected in parallel with a diode 228 between ground and the collector of a transistor 229. The emitter is connected through a resistor 230 to the power supply terminal 146. The base of the transistor 229 is connected to the terminal 146 through a resistor 231 and a diode 232 and through a coupling capacitor 233 to the circuit point 201. Negative pulses developed at the circuit point 201 are amplified by the transistor 229 and are applied through the transformer 226 to the base-emitter circuits of the sampler transistors 189 and 190.

The signal developed on line 192 is applied directly to the base of a transistor 235. Its emitter is connected directly to the base of a second transistor 236. The collectors of the transistors 235 and 236 are connected together and to the power supply terminal 146. The emitter of transistor 236 is connected to ground through a resistor 237 and through a resistor 238 to the base of a transistor 239. The emitter of transistor 239 is connetced to ground through a resistor 240. The collector thereof is connected through a resistor 241 to the power supply terminal 146 and through a resistor 242 to the base of a transistor 243. Its collector is connected to the power supply terminal 146, and its emitter is connected through a resistor 244 to ground and directly to an output terminal 245. The transistors 235 and 236 operate as emitter-followers to apply the signal to the base of transistor 239. There the signal is amplified, inverted, and applied to the transistor 243 which is operated as an emitter-follower, with direct coupling between the stages such as to provide DC amplification.

The output signal developed at the terminal 245 is applied to the input terminal 140 of the amplifier 64, shown in FIG. 3. It should be noted that the time constant of the input circuit of the amplifier 64 (the capacitor 139 and the resistor 138) is relatively large. Thus, the amplifier 64 will pass very low frequency components. At the same time, both the amplifier 64 and the amplifier formed by transistors 235, 236, 239, and 243 will pass high frequency components corresponding to rapid change in the rate of the horizontal synchronizing pulses. As a result, it is possible to obtain an optimum damping effect in the head motor servo system. This provides extremely stable and reliable operation, with jitter effects being substantially eliminated.

It will be understood that modifications and variations may be effected without departing from the spirit and scope of the novel concepts of this invention.

We claim as our invention:

1. In a phase modulator system, means for supplying first and second reference AC signals in approximately 90 degree phase relation, means for supplying a control signal, amplitude modulator means responsive to said control signal and to said first reference AC signal for developing an amplitude modulated AC signal having an amplitude proportional to deviation of said control signal from a certain reference level and either in phase or 180 degrees out of phase with said first reference AC signal according to the direction of said deviation from said reference level, and mixer means combining said amplitude modulated signal and said second reference AC signal to produce a phase modulated signal having an amplitude approximately equal to that of said second reference AC signal.

2. In a phase modulator system as defined in claim 1, second amplitude modulation means responsive to said control signal and to said second reference AC signal for developing a second amplitude modulated AC signal having an amplitude proportional to deviation of said control signal from said certain reference level and either in phase or 180 degrees out of phase with said second reference AC signal according to the direction of said deviation from said reference level, and second mixer means combining said second amplitude modulated signal and said first reference AC signal to produce a second phase modulated signal having an amplitude approximately equal to that of said first reference AC signal.

3. In a phase modulator system as defined in claim 2, a two phase AC motor, and means for applying said phase modulated signals to said AC motor.

4. In a phase modulator system as defined in claim 1, an AC motor, said control signal supplying means including means driven by said motor for developing said control signal in response to velocity changes, and means for energizing said AC motor from said phase modulated signal.

5. In a phase modulator system as defined in claim 1, video signal recording apparatus including head means movable across a magnetic medium to produce information signals and synchronizing signals, said control signal supplying means including discriminator means responsive to said synchronizing signals to control the amplitude of said control signal in response to variations in the rate of said synchroniznig signals, an AC motor for driving said head means, and means for energizing said AC motor from said phase modulated signal.

6. In a phase modulator system as defined in claim 5, said synchronizing signals being in the form of periodic synchronizing pulses, means for developing a reference switching signal at a stabilized rate corresponding to the average rate of said synchronizing pulses, and means responsive to said reference switching signal and said synchronizing pulses to control the amplitude of said control signals in response to deviations of the rate of said synchronizing pulses from said average rate.

7. In a phase modulator system as defined in claim 1, said amplitude modulator means comprising first and second non-linear circuit elements having characteristics such that the impedance thereof varies in accordance with current therethrough, circuit means connecting said elements in generally parallel relation, means for applying said first reference AC signal to vary the total current through said elements, means for applying said control signal to vary the current flow through said first element in relation to the current flow through said second element, and means responsive to current flow through one of said elements to develop said amplitude modulated AC signal.

8. In a phase modulator system as defined in claim 1, said amplitude modulator means comprising a balanced modulator circuit operative to balance out said control signal from said amplitude modulated AC signal.

9. In a phase modulator system as defined in claim 1, said amplitude modulator means comprising first, second, third and fourth non-linear circuit elements having characteristics such that the impedance thereof varies in accordance with current therethrough, first circuit means connecting said first and second elements in generally parallel relation, second circuit means connecting said third and fourth elements in generally parallel relation, means for applying said first reference AC signal to vary the total current through said first and second elements and also the total current through said third and fourth elements, means for applying said control signal to vary the current flow through said first element in relation to the current flow through said second element, means for applying said control signal in inverse phase relation to vary the current flow through said third element in relation to the current flow through said fourth element, and means responsive to current flow through said first and third elements to develop said amplitude modulated AC signal.

10. In a modulator system, first and second non-linear circuit elements having characteristics such that the impedance thereof varies in accordance with current therethrough, circuit means connecting said elements in generally parallel relation, thereby forming a current divider, first signal means for applying a first signal to vary the total current through said elements, second signal means for applying a second signal to vary the current through said first element, thereby varying the division of current with said second element, and servo control means operated responsive to current flow through one of said elements.

11. In a modulator system as defined in claim 10, said characteristics of said circuit elements being such that the current therethrough varies exponentially with the voltage thereacross.

12. In a modulator system as defined in claim 10, said elements being semi-conductor diodes.

13. In a modulator system as defined in claim 10, said first signal means having a high output impedance.

14. In a modulator system, first and second non-linear elements having characteristics such that the impedance thereof varies in accordance with current therethrough, circuit means connecting said elements in generally parallel relation, thereby forming a current divider, first signal means for applying a first signal to vary the total current through said elements, second signal means for applying a second signal to vary the current through said first element, thereby varying the division of currents with said second element, utilization means operated responsive to current flow through one of said elements, and first and second amplifier devices in series with said first and second non-linear circuit elements and having control electrodes, said second signal means comprising means for applying said second signal to said control electrode of said first amplifier device.

15. In a modulator system, first and second non-linear elements having characteristics such that the impedance thereof varies in accordance with current therethrough, circuit means connecting said elements in generally parallel relation, thereby forming a current divider, first signal means for applying a first signal to vary the total current through said elements, second signal means for applying a second signal to vary the current through said first element, thereby varying the division of currents with said second element, utilization means operated responsive to current flow through one of said elements, a voltage supply source, said first signal means including an amplifier device coupled between said circuit elements and said voltage source and having a control electrode, and means for applying said first signal to said control electrode.

16. In a modulator system, first and second non-linear elements having characteristics such that the impedance thereof varies in accordance with current therethrough, circuit means connecting said elements in generally parallel relation, thereby forming a current divider, first signal means for applying a first signal to vary the total current through said elements, second signal means for applying a second signal to vary the current through said first element, thereby varying the division of currents with said second element, utilization means operated responsive to current flow through one of said elements, third and fourth non-linear circuit elements having characteristics such that the impedance thereof varies in accordance with current therethrough, circuit means connecting said third annd fourth elements in generally parallel relation, thereby forming a current divider, third signal means for applying a third signal to vary the total current through said third and fourth elements, and fourth signal means for applying a fourth signal to vary the current flow through said third element, thereby altering the division of current flow with said fourth element, said utilization means being operated responsive to current flow through said first and fourth elements.

17. In a modulator system as defined in claim 16, said second and fourth signals being substantially the same, and said first and third signals being substantially the same, but being applied in inverse phase relation.

18. In a modulator system as defined in claim 14, means for applying a balance voltage to said control electrode of said second amplifier device.

19. In a modulator system as defined in claim 14, said first and second amplifier devices being transistors.

20. In a modulator system as defined in claim 15, said amplifier device being a transistor having collector and emitter electrodes and having a base electrode constituting said control electrode, means coupling said collector electrode to said elements, and resistance means connecting said emitter electrode to said voltage source.

References Cited

UNITED STATES PATENTS 3,253,237 5/1966 Runyan ---------------- 332—16

ALFRED L. BRODY, Primary Examiner

U.S. Cl. X.R.

307—241; 328—71, 163; 332—16, 19